(12) United States Patent
Lewis

(10) Patent No.: US 10,606,843 B2
(45) Date of Patent: *Mar. 31, 2020

(54) IRREDUCIBLE MODULES

(71) Applicant: INTERNATIONAL BUSINESS MACHINES CORPORATION, Armonk, NY (US)

(72) Inventor: William J. Lewis, Coraopolis, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 702 days.

This patent is subject to a terminal disclaimer.

(21) Appl. No.: 15/360,163

(22) Filed: Nov. 23, 2016

(65) Prior Publication Data

US 2017/0075961 A1    Mar. 16, 2017

Related U.S. Application Data

(63) Continuation of application No. 14/048,876, filed on Oct. 8, 2013, now Pat. No. 9,569,187.

(51) Int. Cl.
    *G06F 8/35*       (2018.01)
    *G06F 16/2457*    (2019.01)
    (Continued)

(52) U.S. Cl.
    CPC .......... *G06F 16/24575* (2019.01); *G06F 7/08* (2013.01); *G06F 7/10* (2013.01);
    (Continued)

(58) Field of Classification Search
    CPC ............ G06F 16/2282; G06F 16/2379; G06F 16/24575; G06F 7/08; G06F 7/10;
    (Continued)

(56) References Cited

U.S. PATENT DOCUMENTS 5,937,195 A    8/1999  Ju et al.
6,268,850 B1   7/2001  Ng
(Continued)

FOREIGN PATENT DOCUMENTS

WO    0250670 A1    6/2002

OTHER PUBLICATIONS

"The Authoritative Dictionary of IEEE Standards Terms", 2000, IEEE, 7th ed. p. 450.
(Continued)

*Primary Examiner* — Jason D Mitchell
(74) *Attorney, Agent, or Firm* — James Nock; Andrew M. Calderon; Roberts Mlotkowski Safran Cole & Calderon, P.C.

(57) ABSTRACT

An approach to generating irreducible modules. The approach includes a method that includes receiving, by at least one computing device, data associated with a specification. The method includes defining, by the at least one computing device, a pattern on the received data. The pattern reduces a set of rules into a single condition. The method includes generating, by the at least one computing device, an irreducible module based on the pattern. The irreducible module has one output dependent variable and is associated with a data flow application.

17 Claims, 7 Drawing Sheets

(51) Int. Cl.
- *G06F 8/30* (2018.01)
- *G06F 16/22* (2019.01)
- *G06F 16/23* (2019.01)
- *G06F 8/41* (2018.01)
- *G06F 7/08* (2006.01)
- *G06F 7/10* (2006.01)

(52) U.S. Cl.
CPC .................. *G06F 8/30* (2013.01); *G06F 8/35* (2013.01); *G06F 8/4434* (2013.01); *G06F 16/2282* (2019.01); *G06F 16/2379* (2019.01); *G06F 8/44* (2013.01)

(58) Field of Classification Search
CPC ... G06F 8/30; G06F 8/35; G06F 8/355; G06F 8/36; G06F 8/40; G06F 8/44; G06F 8/4434
USPC .................................................. 717/106–109
See application file for complete search history.

(56) References Cited

U.S. PATENT DOCUMENTS

| | | |
|---|---|---|
| 6,651,240 B1 | 11/2003 | Yamamoto et al. |
| 6,772,414 B1 | 8/2004 | Roediger et al. |
| 7,047,518 B2 | 5/2006 | Little et al. |
| 7,313,773 B1 | 12/2007 | Braun et al. |
| 8,271,935 B2 | 9/2012 | Lewis |
| 8,856,766 B2 | 10/2014 | Frenkiel et al. |
| 8,863,075 B2 | 10/2014 | Said et al. |
| 2002/0138727 A1 | 9/2002 | Dutta et al. |
| 2004/0268322 A1 | 12/2004 | Chow et al. |
| 2005/0071827 A1 | 3/2005 | Lai |
| 2005/0204344 A1 | 9/2005 | Shinomi |
| 2006/0064680 A1 | 3/2006 | Devane |
| 2006/0136885 A1 | 6/2006 | Stattenfield |
| 2006/0265396 A1 | 11/2006 | Raman et al. |
| 2007/0157169 A1 | 7/2007 | Chen et al. |
| 2007/0174318 A1* | 7/2007 | Leff .......................... G06F 8/38 |
| 2007/0198971 A1 | 8/2007 | Dasu et al. |
| 2008/0120497 A1 | 5/2008 | Chai et al. |
| 2008/0127040 A1* | 5/2008 | Barcellona ................ G06F 8/10 717/101 |
| 2008/0168428 A1 | 7/2008 | Bates et al. |
| 2009/0077119 A1 | 3/2009 | Speth et al. |
| 2010/0011338 A1 | 1/2010 | Lewis |
| 2012/0017067 A1 | 1/2012 | Sankaran et al. |
| 2012/0047353 A1 | 2/2012 | Gupta et al. |
| 2012/0195208 A1 | 8/2012 | Abel et al. |
| 2012/0233586 A1 | 9/2012 | Lewis |
| 2013/0014093 A1 | 1/2013 | Lee |
| 2013/0031531 A1 | 1/2013 | Keynes et al. |
| 2013/0067205 A1 | 3/2013 | Plondke et al. |
| 2014/0244968 A1 | 8/2014 | Greyzok et al. |

OTHER PUBLICATIONS

Brzozowski, Janusz. et al., "Representation of semiautomata by canonical words and equivalences, part II: Specification of software modules", International Journal of Foundations of Computer Science18, No. 05, 2007, pp. 1-23.

Praditwong, Kata, et al., "Software module clustering as a multi-objective search problem", Software Engineering, IEEE Transactions, Oct. 29, 2009, pp. 1-28.

Stevens, W.P., "How data flow can improve application development productivity", IBM Syst, 1982, vol. 21, No. 2, pp. 162-178.

Morrison, J.P., "Data stream linkage Mechanism", IBM Syst, 1978, vol. 17, No. 4, pp. 383-403.

\* cited by examiner

| Statement Name 502 | Constant Value 504 | Variable Prefix 506 | Variable Name 508 | Variable Suffix 510 | Line Sequence 512 | Token Sequence Number 514 |
|---|---|---|---|---|---|---|
| Indvar 2 Open | , "< | | | | 200 | 3 |
| Indvar 2 Open | | | Indvar 2 parent | | 200 | 4 |
| Indvar 2 Open | "); | | | | 200 | 5 |
| Indvar 2 While | while ( | | | | 210 | 1 |
| Indvar 2 While | | < | Indvar2 parent | > | 210 | 2 |
| Indvar 2 While | ){ | | | | 210 | 3 |
| Indvar 2 My | My( | | | | 230 | 1 |
| Indvar 2 My | | $ | Indvar2 parent | | 230 | 2 |
| Indvar 2 My | )= $_;( | | | | 230 | 3 |
| Indvar 2 Field | | $ | Indvar2 | | 240 | 1 |
| Indvar 2 Field | | $ | Indvar2 sibling | | 240 | 1 |
| Indvar 2 Field | | $ | Indvar2 pk | | 240 | 1 |
| Indvar 2 Split | ) = Split " " | | | | 250 | 1 |
| Indvar 2 Split | | $ | Indvar2 parent | | 250 | 2 |
| Indvar 2 Split | ; | | | | 250 | 3 |
| Indvar 2 If | If (join "", | | | | 250 | 1 |
| Indvar 2 If | | $ | Indvar2 pk | _boolean, | 260 | 20 |
| Indvar 2 If | == Join "", | | | | 260 | 30 |
| Indvar 2 If | | $ | Indvar2 pk | | 260 | 40 |

FIG. 5

IRREDUCIBLE MODULES

FIELD OF THE INVENTION

The present invention generally relates to computer applications, and more particularly, to a method and system for generating irreducible modules.

BACKGROUND

Parallel computing is a process that performs multiple computations simultaneously by utilizing multiple processing elements (e.g., multi-core devices) within a single computing device or multiple computing devices. For functions to be implemented by a parallel computing system, a compiler is used to determine how different functions are going to operate within the parallel computing system. One way to generate functions by a compiler is to implement data-flow programming concepts. Data flow programming concepts allow for creating modules that address a specification by relating the modules to each other only by the data that is passed between the modules.

To implement data flow techniques, specialized software and/or hardware infrastructure (e.g., the Manchester tagged data flow model) is used to generate unique identifiers. For example, the Manchester tagged data flow model uses a process to tag each data flow with a unique identifier and accordingly matches the different data flows so that they can be processed together.

SUMMARY

In a first aspect of the invention, a method includes receiving, by at least one computing device, data associated with a specification. The method further includes defining, by the at least one computing device, a pattern based on the received data. The pattern reduces a set of rules into a single condition. The method further includes generating, by the at least one computing device, an irreducible module based on the pattern. The irreducible module has one output dependent variable and is associated with a data flow application.

In another aspect of the invention, there is a computer program product for providing an irreducible module. The computer program product includes a computer usable storage medium having program code embodied in the storage medium. The program code is readable/executable by a computing device to receive data associated with a specification. The computer program product includes determining a pattern based on the received data. The computer program product includes reducing a set of rules into a single condition and determining how different irreducible modules can be combined based on the pattern. The computer program product includes generating the irreducible module which is independent of other irreducible modules.

In a further aspect of the invention, a system includes a CPU, a computer readable memory and a computer readable storage medium. Additionally, the system includes one or more program instructions. Program instructions are operable to receive information associated with a specification associated with a data driven application engineering (DDAE) format. Program instructions define a pattern, based on receiving the information, with which a set of irreducible modules are created and combined into any application that includes parallel computing or data flow application. Program instructions reduce a set of rules associated with the pattern by using Boolean variables. Program instructions use a compilable language that includes a metamodel and a matrix that defines a relationship between tokens, lines, and statements within code associated with the compilable language. Program instructions generate the set of irreducible modules based on the metamodel and the matrix. The irreducible module within the set of irreducible modules is independent of other irreducible modules within the set of irreducible modules. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 shows an example compilable module as a two dimensional matrix in accordance with aspects of the invention.

DETAILED DESCRIPTION

Figure 1:
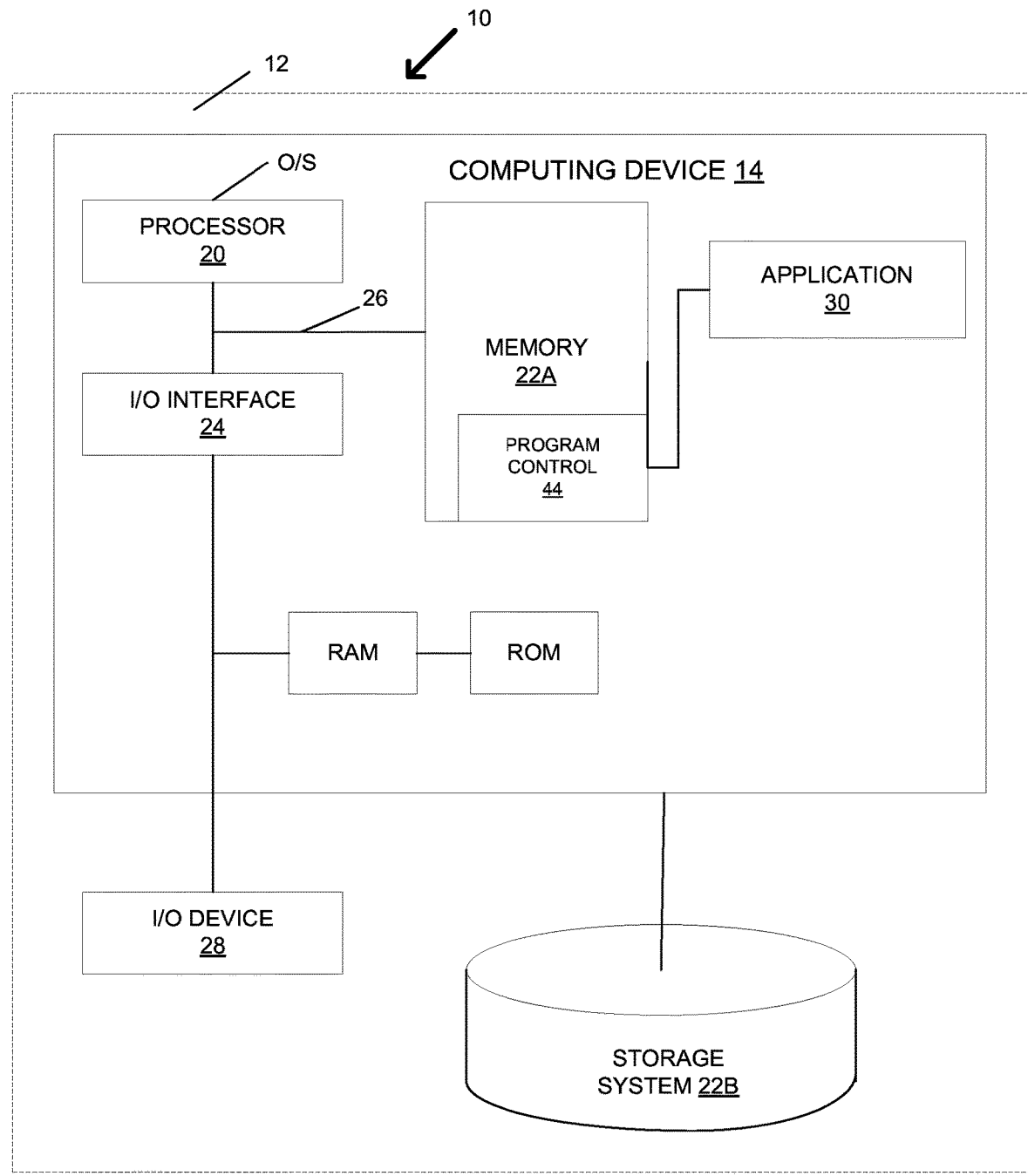
FIG. 1 shows an illustrative environment for implementing the steps in accordance with aspects of the invention.

The present invention generally relates to computer applications, and more particularly, to a method and system for generating irreducible modules. In embodiments, irreducible modules can be generated by a compiler based on requirements of a specification (e.g., calculate cost of products ordered, calculate operational costs for operating machinery, calculate marketing costs associated with launching a new product, etc.) provided by a user. An irreducible module can have two or three independent input variables and one output dependent variable. Further, an irreducible module can be a comparison, gate, or calculation connector.

Since specifications are generalizations or abstracts of all possible outcomes, the irreducible modules have to be able to deal with the added complexity of multiple outcomes. Accordingly, the present invention effectively transforms abstract specifications in a predictable method that is accomplished through controlled iterations through multiple instances or processing an entire set as a single issue. As such, the present invention accomplishes these goals by: (i) defining a unique pattern with which a set of modules or building blocks can be created and combined into any application, including parallel and data flow applications; (ii) reducing a set of rules, such as a specification, of any level of complexity into a single condition by using Boolean variables; (iii) representing a process in any compilable language as a matrix; and (iv) using instance identification in a data flow environment by using relational database concepts.

To achieve the goal of reducing the number of irreducible modules, the present invention uses a procedure for transforming data driven application engineering (DDAE) specifications into structured compilable code modules. As such, to generate the structured compilable code modules, a defined metamodel is used that allows for the automatic transformation of the DDAE specifications.

Furthermore, the present invention ensures that the resulting compilable code creates irreducible modules related only by the data passed between each irreducible module. As such, this eliminates any consideration of operational sequencing and reduces the number of compilable modules. Further, this allows for the automated generation of the compilable modules from business requirement specifications. To achieve simplification of the compilable modules and automated generation, data flows between modules are identified by primary key values. Thus, irreducible modules output a single flow and each instance within such a flow contains unique primary key values.

As a result, and advantageously, the present invention can be applied to both persistent data and also to data being sent to achieve the same objectives as the Manchester tagged data flow model. This ensures that the present invention does not require specialized hardware/software infrastructure to implement data flow concepts. Furthermore, additional advantages of the present invention include reducing complexity of application development, improving the ability to reuse developed functions, and enabling improvements in parallelization, distribution flexibility, and/or application self configuration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be generated or written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

Computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In general, processor 20 executes computer program code (e.g., program control 44), which can be stored in memory 22A and/or storage system 22B. Moreover, in accordance with aspects of the invention, program control 44 controls an application 30, e.g., the processes described herein. Application 30 can be implemented as one or more program code in program control 44 stored in memory 22A as separate or combined modules. Additionally, the application 30 may be implemented as separate dedicated processors or a single or several processors to provide the function of these tools.

While executing the computer program code, the processor 20 can read and/or write data to/from memory 22A, storage system 22B, and/or I/O interface 24. The program code executes the processes of the invention. The bus 26 provides a communications link between each of the components in computing device 14.

Application 30 may generate an irreducible module based on one or more DDAE connectors associated with a DDAE specification model. In embodiments, application 30 may receive the DDAE specification model via a user interface associated with application 30. In further embodiments, a complete specification for a calculation includes all condition tests that are required for assigning a correct value to the dependent variable. Since the number of tests and related variables can be infinite, a connector pattern is determined by application 30 to bring the number of tests and related variables to a finite amount. Further, the connector pattern can be used to modularize prerequisite condition tests as comparisons and gates which allows for the value of the dependent variable to be associated with a single Boolean variable.

In further embodiments, the connector pattern is generated by application 30 by using an intermediate model, known as a metamodel. The metamodel may use a structured data-centric method. In embodiments, the structured data-centric method includes types, variables, connectors, and the interrelationships between the types, variables, and connectors. In embodiments, each code module can have two or three input variables (e.g., independent variables—"indvars") and one output variable (e.g., dependent variable—"depvar"). The output variable, which can be a Boolean variable, provides that the calculations are conditional. Since each code module is defined with two or three inputs and one output, the code modules are specified at an irreducible level, i.e., as irreducible modules, such that each module assigns a value to one variable. Accordingly, each code module is a calculation, comparison, or a gate connector based on the connector pattern.

In embodiments, a calculation connector can connect two or three independent variables, one of which is Boolean, with one dependent variable. The two independent variables are combined by an operation to yield a value which is then assigned to the dependent variable. The Boolean independent variable expresses the constraint that calculations are always conditional. The calculations can include numeric functions (e.g., add, subtract, divide, etc.), string functions (e.g., concatenate), and/or aggregate functions (e.g., sum, minimum, maximum, average, etc.). Regarding aggregate functions, only two independent variables are needed. For preconditions on aggregate functions (equivalent to SQL GROUP BY), the two independent variables can be the same. For example "where product_identifier" is equivalent to "GROUP BY product_identifier," a calculation is performed where all product_identifiers are equal.

To limit an infinite number of condition tests associated with a specification, the connector pattern modularizes the condition tests as comparisons and gates which allows for the presentation of the result as a single Boolean variable. As such, the present invention provides for dependent variables for comparisons and gates to be externalized as named variables within named data flows.

In embodiments, a comparison connector can be defined as a precondition that constrains a calculation. For example, a comparison connector can connect two non-Boolean independent variables with one Boolean dependent variable by comparing the two independent variables. The comparison between two variables can include comparing whether the two variables are equal to each other, whether one variable is greater than the other variable, whether one variable is less than the other variable, and/or any other type of comparison between the two variables. For example, if the comparison of the two independent variables is TRUE, then a value of 1 is assigned to the dependent variables. If the comparison of the two independent variables is not true, i.e., FALSE, then a value of zero is assigned to the dependent variable.

In embodiments, gate connectors (e.g., AND, OR, NAND, NOR, etc.) can connect two Boolean independent variables with one Boolean dependent variable by multiplying the values of the independent variables and assigning the result to a dependent variable. In embodiments, application 30 can generate an irreducible module by reducing a set of rules into a single condition by using such gates with Boolean variables.

In embodiments, application 30 can also generate relationships between tokens, lines, and statements that can be used by a compiler (within application 30) to generate irreducible modules. A token can be a character, symbol, string, or any other element that can make up a line. Further, a line can be a part of a statement, and a statement can be a command such as OPEN, WHILE, etc.

Figure 2:
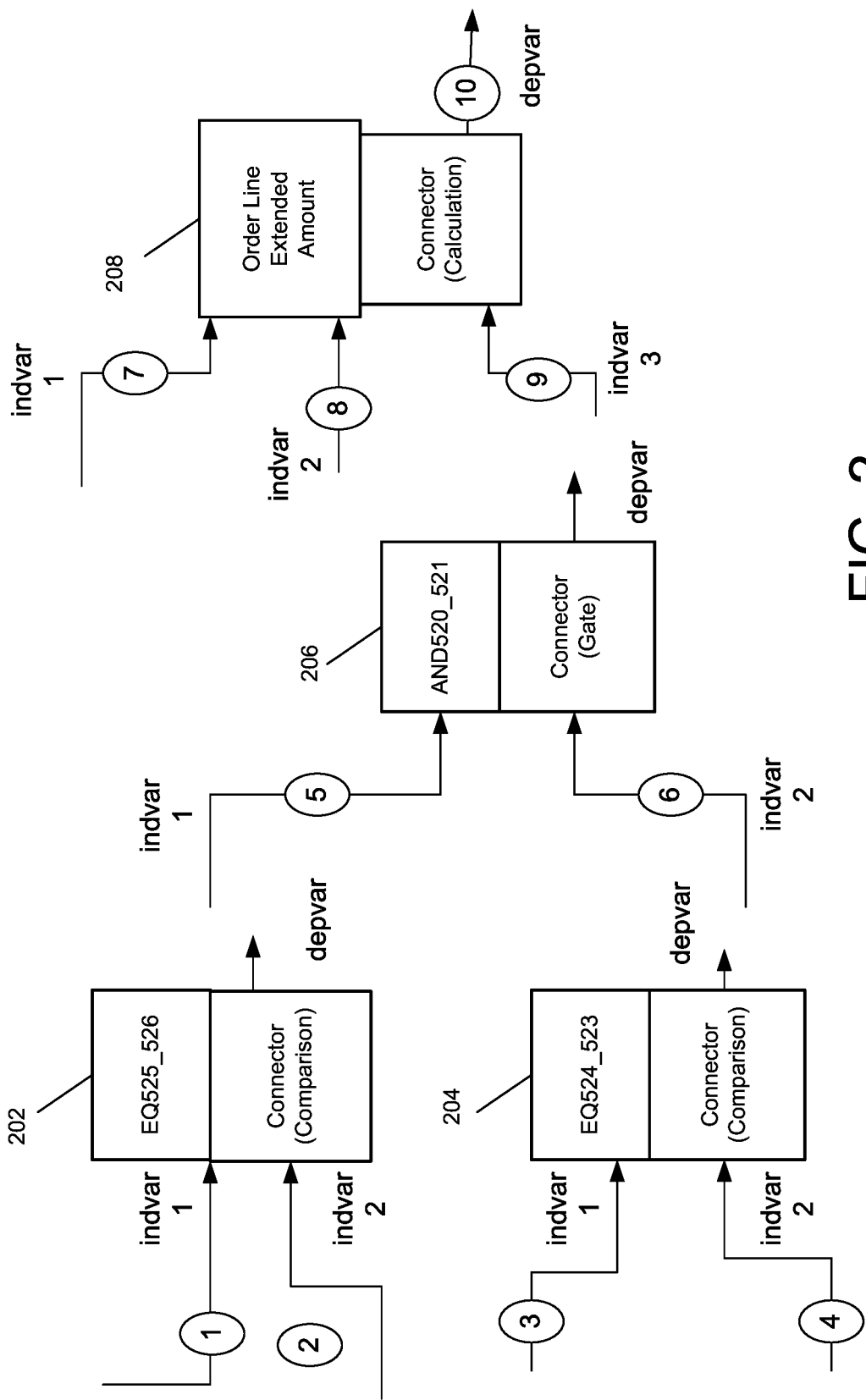
FIG. 2 shows an example module in accordance with aspects of the invention.

FIG. 2 shows an example target model in accordance with aspects of the invention. FIG. 2 shows an example statement in DDAE style notation. For example, FIG. 2 shows a connector 202, a connector 204, a connector 206, and connector 208. While FIG. 2 shows connectors 202, 204, 206, and 208, a target model can have a fewer or greater quantity of connectors and have a fewer or greater quantity of independent and/or dependent variables.

The example target model, as shown in FIG. 2, may be associated with deriving a value for a variable "Order Line Extended Amount" and can be associated with the following example statement from a specification:

SELECT units_ordered*unit_price as order_line_extended_amount from order_line, product
where product_identifier=order_line_product_id
and
units_ordered<units_on_hand The example statement includes four connectors (multiply, <, =, AND) and 10 data flows. Each data flow can be associated with one or more variables. For example, the data flows 2, 4, 8 can be assigned values for a product and data flows 1, 3, 7 can be assigned values for an order line.

By way of illustrated example, data flow 5 can be determined by connector 202 (EQ525_526), which is a comparison connector. In this example, it is determined whether the value of the orderline variable in data flow 1 and the value of the product variable in data flow 2 are equal. If the values are equal, data flow 5 is assigned an output value of one or TRUE. Further, data flow 6 is determined by connector 204 (GE524_523), which is also a comparison connector, whether the value of the order line variable in data flow 3 is greater or equal than the value of the product variable in data flow 4. If the values are greater or equal, data flow 6 is assigned an output value of one or TRUE.

By way of illustrated example, data flow 9 is determined by connector 206 (AND 520_521), which is a gate connector. In this example, it is determined whether both data flows 5 and 6 are equal to one/TRUE. If the values are equal, data flow 9 is set to one. Data flow 10 is determined by connector 208 (order line extended amount), which is a calculator connector, by taking the product of data flows 7 (order line) and 8 (product) only if the value of data flow 9 is equal to one. This can result in data flow 10 being assigned a value associated with the product of data flows 7 and 8.

Figure 3:
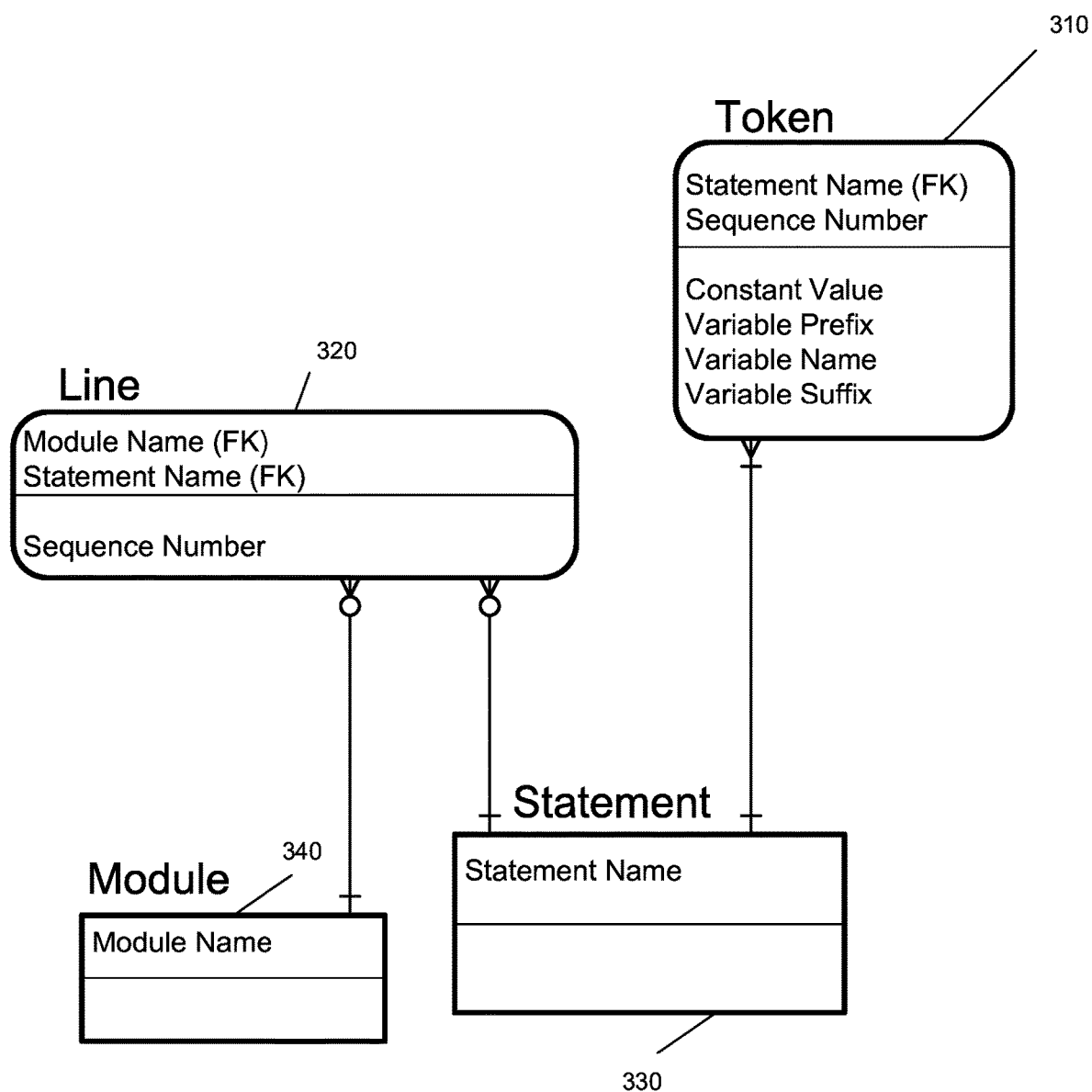
FIG. 3 shows an example metamodel in accordance with aspects of the invention.

FIG. 3 shows an example metamodel in accordance with aspects of the invention. Specifically, FIG. 3 shows a token entity 310, line entity 320, statement entity 330, and module 340. In embodiments, the metamodel can be generated by a metamodel requirements tool within an application. A metamodel can be a model construct that shows how parts of a compilable code module are related to each other. Similar to the manner in which the language of DDAE provides a rigorous structure for business requirement specifications, the metamodel also imposes a level of rigor on the target compilable language which enables a simplified application generation process. Accordingly, the metamodel can represent code in any compilable language.

Token entity 310 can be a part of the metamodel that defines elements of tokens and relationships of the token with a foreign key associated with a statement. For example, token entity 310 can include a constant value, variable prefix, variable name, and variable suffix.

Line entity 320 can be a part of the metamodel that includes a number of the line, a foreign key that is associated with a statement name, and another foreign key associated with a module name. Accordingly, the foreign keys allow for a relationship between Line entity 320 and the statement name and the module name. Line entity 320 can also include a sequence number. Statement entity 330 is a part of the metamodel that defines a statement and module 340 is a part of the metamodel that defines a module.

Figure 4:
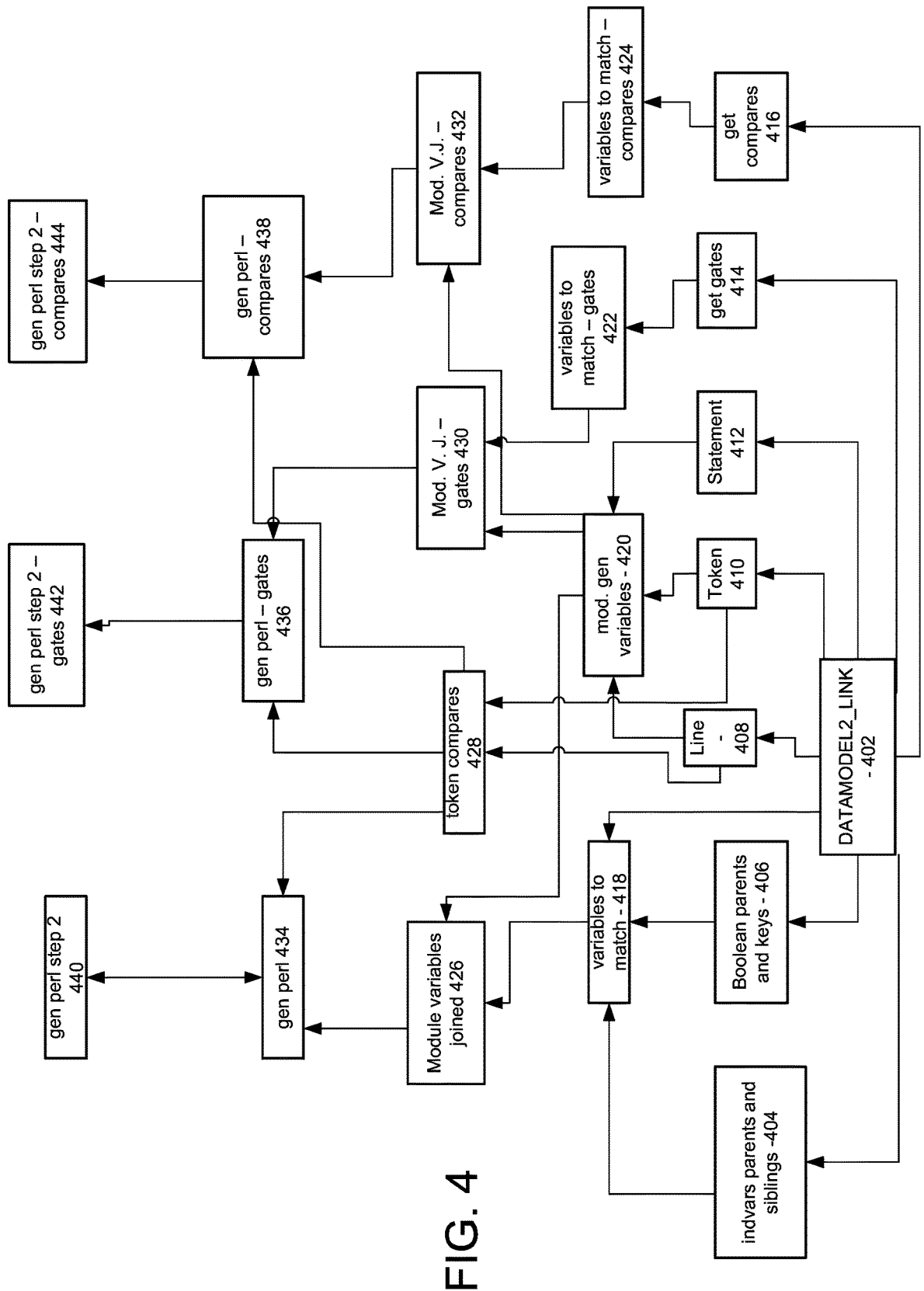
FIG. 4 shows a functional block diagram of an environment for transforming specifications into an irreducible module in accordance with aspects of the invention.

FIG. 4 shows a functional block diagram of an example environment for transforming specifications into irreducible modules in accordance with aspects of the invention. The environment includes a number of SQL queries, labeled as follows: datamodel2_link 402, indvars parent and siblings 404, Boolean parents and keys 406, line 408, token 410, statement 412, get gates 414, get compares 416, variables to match 418, module gen variables 420, variables to match—gates 422, variables to match—compares 424, module variables joined 426, token constants 428, module variables joined—gates 430, module variables joined—compares 432, gen perl 434, gen perl—gates 436, gen perl—gates 438, gen perl step 2 440, gen per' step 2—gates 442, and gen per' step 2—compares 444.

Datamodel2_link 402, line 408, token 410, statement 412, module gen variables 420, and token constants 428 represent common components used in deriving the target model. Indvars parents and siblings 404, Boolean parents and keys 406, variables to match 418, module variables joined 426, gen perl 434, and gen perl step 2 440 represent modules used to generate calculation modules in the target model. Get gates 414, variables to match—gates 422, module variables joined—gates 430, gen perl—gates 436, and gen perl step 2—gates 442 represent components used to generate gate modules in the target model. Get compares 416, variables to match compares 424, module variables joined—compares 432, gen perl compares 438, and gen perl step 2—compares 444 represent components used to generate compare modules in the target model. While FIG. 4 describes a series of SQL queries used to generate modules in the Perl programming language, FIG. 4 can also describe the use of other programming languages (e.g., C++, Java, etc.) to generate irreducible modules.

Datamodel2_link 402 accesses the information associated with the inputted requirements of a specification. In embodiments, datamodel2_link 402 may use the information to determine the relationships between different parts of the compilable code needed to generate the irreducible modules. Indvars parents and siblings 404 determine independent variables and their parent and sibling relationships. Boolean parents and keys 406 determines Boolean variables and their parents and their keys. Line 408 accesses program lines within the source code model. For example, a line in a program could be "IF_X_=10 THEN_Y_=5."

Token 410 accesses units within a line in the source code model. For example, a line of a program "IF_M_<12 THEN STOP" includes the tokens "IF", "M", "<, 12", "THEN", and "STOP." The token can be a quoted string, a word, a symbol, or any other type of token.

Statement 412 can be a statement associated with lines 408 and/or tokens 410. Statement 412 can be determined by a key word that begins a statement (e.g., OPEN). There may be different types of statements, such as null statements, assignment statements, sum statements, etc. Get gates 414 can be an SQL query/command that accesses gates that may be irreducible modules. Get compares 416 can be an SQL query/command that accesses compares that may be irreducible modules. Variables to match 418 can be an SQL query/command that brings together all variables, keys and siblings for each calculation module. Module gen variables 420 can be an SQL query/command that brings together the variable types, tokens, lines and statements for use within the irreducible modules.

Variables to match—gates 422 can be an SQL query/command that brings together all variables, keys and siblings for each gate module. Variables to match—compares 424 can be an SQL query/command that brings together all variables, keys and siblings for each compare module. Module variables joined 426 can be an SQL query/command that combines the generated variables in block 420 with the variables in block 418.

Token constants 428 can be an SQL query/command that generates token constants based on line 408 and token 310. Module variables joined—gates 430 can be an SQL query/command that combines the results from block 422 with the results from block 420. Module variables joined—compares 432 can be an SQL query/command that combines the results from block 424 with those from block 420. Gen pert 434 can be an SQL query/command that generates irreducible calculation modules in the Perl language plus required sequencing and labels. Gen perl—gates 436 can be an SQL query/command that generates irreducible gate modules in the Perl language plus any required sequencing and labels. Gen perl—compares 438 can be an SQL query/command that generates irreducible compare modules in the Perl language plus any required sequencing and labels.

Gen perl step 2 440 can be an additional SQL query/command that removes all non-Perl data and generates compile-ready code for irreducible calculation modules. Gen perl step 2—gates 442 can be an additional SQL query/command that removes all non-Perl data and generates compile-ready code for irreducible gate modules. Gen perl step 2—compares 444 can be an additional SQL query/command that removes all non-Perl data and generates compile-ready code for irreducible compare modules.

FIG. 5 shows an example compilable module as a two dimensional matrix in accordance with aspects of the invention. While FIG. 5 shows an example extract of a Perl target model, the two dimensional matrix can be associated with other types of target models such as a C++ target model, a Java target model, etc. Each row of the two dimensional matrix is a token (either a constant or a variable) within a line, and each line is within a statement. Accordingly, the sequence of tokens and lines allows for a compiler to correctly generate a compilable text listing. Variables in a requirements model can be mapped to variables in the target model. Thus, when the transformation process is executed, values in the requirement model are assigned to variables in the target model, and, thus, filling blocks in a template code.

In embodiments, FIG. 5 shows a statement name 502, a constant value 504, a variable prefix 506, a variable name 508, a variable suffix 510, a line sequence number 512, and a token sequence number 514. In embodiments, statement name 502 can be a name associated with a particular command. For example, as shown in FIG. 5, independent variable 2 (Indvar 2) Open can be a statement to declare an input file containing Indvar 2. Additionally, as shown in FIG. 5, Indvar 2 While can be a statement name for a WHILE command. In embodiments, Constant Value 504 can be a non-variable symbol or character.

Variable prefix 506 can be a prefix assigned to a variable name. For example, as shown in FIG. 5, the prefix "$" can be added prior to a variable name such as Indvar 2 parent. Variable Name 508 can be a name assigned to a particular variable. The variables in the requirements model are mapped to variables in the target model. For example, as shown in FIG. 5, variable names from the specification model are assigned to Indvar 2. Different variable names can indicate relationships between different variables, such as Indvar 2 parent and Indvar 2 sibling. Variable suffix 510 can be a suffix assigned to a variable name. For example, as shown in FIG. 5, the variable suffix ">" can be attached to a variable name.

Line sequence number 512 can be a particular line within a statement. Further, token sequence number 514 can be the particular token with a location within a particular line. For example, as shown in FIG. 5, a token associated with token sequence number 4 for line sequence 200 is located after a token associated with token sequence number 3 for the same line sequence 200.

Figure 6:
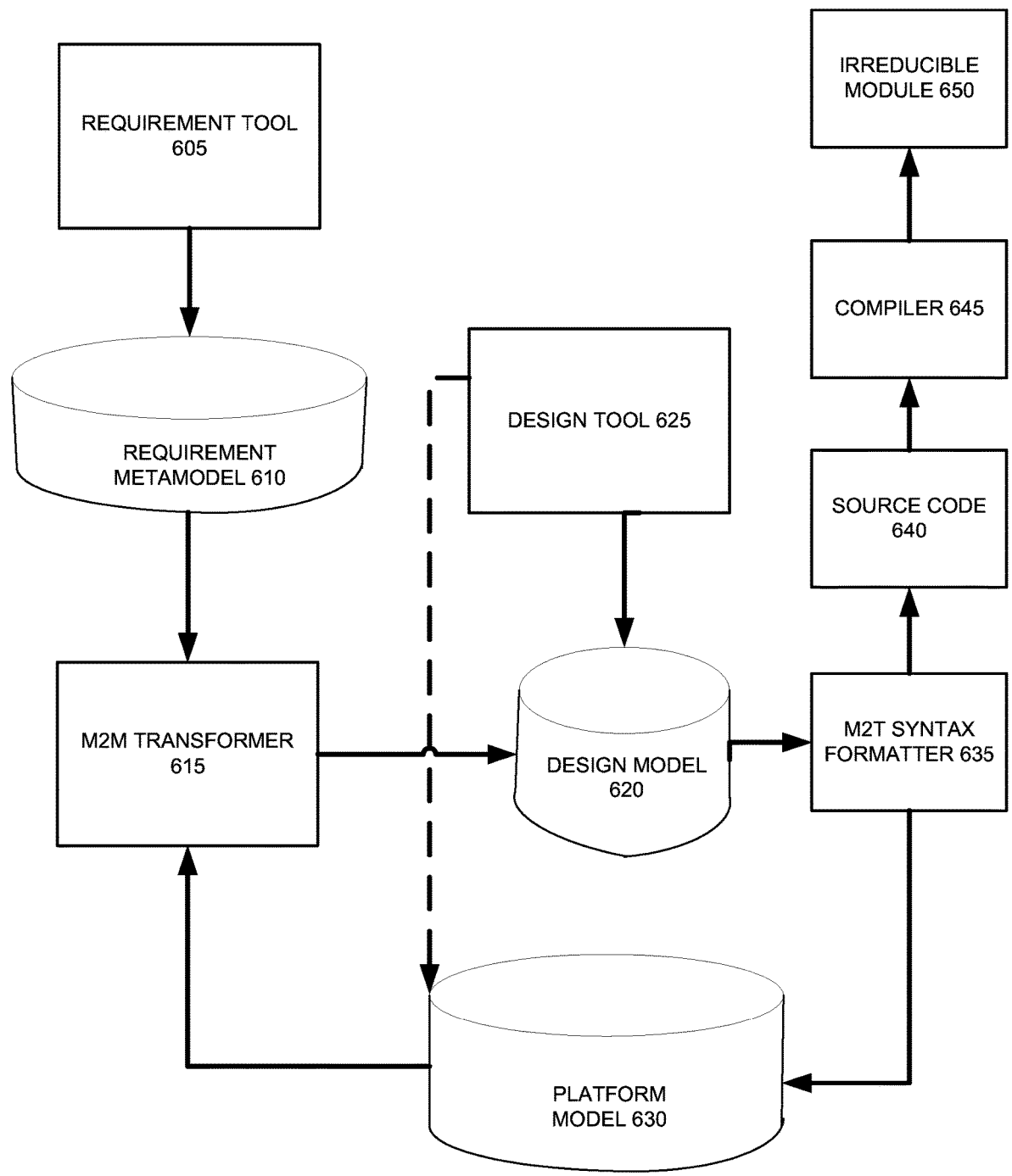
FIG. 6 shows a functional block diagram of an environment for generating irreducible modules in accordance with aspects of the invention.

FIG. 6 shows a functional block diagram of an environment for generating irreducible modules in accordance with aspects of the invention. The environment includes a requirement tool 605, a requirement metamodel 610, model to model (M2M) transformer 615, design model 620, design tool 625, platform model 630, model to text (M2T) syntax formatter 635, source code 640, compiler 645, and irreducible module 650. In embodiments, requirement tool 605, M2M transformer 615, design tool 625, M2T syntax formatter 635, and/or compiler 645 can be part of an application, such as the application described in FIG. 1.

Requirement tool 605 provides a user with a front-end application (e.g., a graphical user interface) that allows for a user to enter data into a database. In embodiments, the data is associated with specifications and rules that can be used to generate an irreducible module. Additionally, the data can be new information and/or updates to information previously entered by the user using DDAE specifications.

Additionally, requirement tool 605 generates requirement metamodel 610. In embodiments, requirement metamodel 610 can be a model that includes a pattern comprised of different comparisons, calculations, and gates. As a result, requirements metamodel 610 may define a pattern which allows for the minimum number of irreducible modules needed to create the requirements of the specification model.

M2M transformer 615 transforms requirement metamodel 610 into design model 620. In embodiments, M2M transformer 615 may receive rules and mapping information from requirement metamodel to perform the transformation. In further embodiments, design model 620 includes any combination of comparison, gate, or calculation connectors that use two or three independent variable inputs and have one dependent variable output. In embodiments, design tool 625 provides a user with the ability to manually modify design model 620 after design model 620 is generated. While shown as a separate application, design tool 625 can be a part of requirement tool 605.

Platform model 630 defines the implementation environment with specific values such as IP address, server name, instance name, syntax, etc. In embodiments, platform model 630 can be generated by design tool 625. Further, platform model 630 comprises data that specifies the platform(s) that the application will be executed on. In further embodiments, design tool 625 can be used to change various aspects of platform model 630. While shown as a separate application, platform model 630 can be a part of design tool 625 and/or requirement tool 605.

M2T syntax formatter 635 transforms design model 620 into source code 640. In embodiments, M2T syntax formatter 635 reformats the properties of design model 620 into a compilable list, such as source code 640. In embodiments, source code 640 includes source code listing (e.g., text, code, etc.) that can be inputted into compiler 645 and executed to create irreducible module 650. Source code 640 can include database data definition language (DDL), programming code, extensible markup language (XML) documents, JavaServer Pages (JSP's), hypertext machine language (HTML) pages, and/or any other compilable list. Thus, compiler 645 can transform source code 640, which is in a programming language, into another computer language, such as assembly language or machine code. Accordingly, compiler 645 transforms source code 640 into an executable program which outputs irreducible module 650. In embodiments, irreducible module 650 can be deployed and executed as original compiled (e.g., 1:1) and/or grouped into larger executables (e.g., additional irreducible modules) by compiler 645.

Flow Diagram

Figure 7:
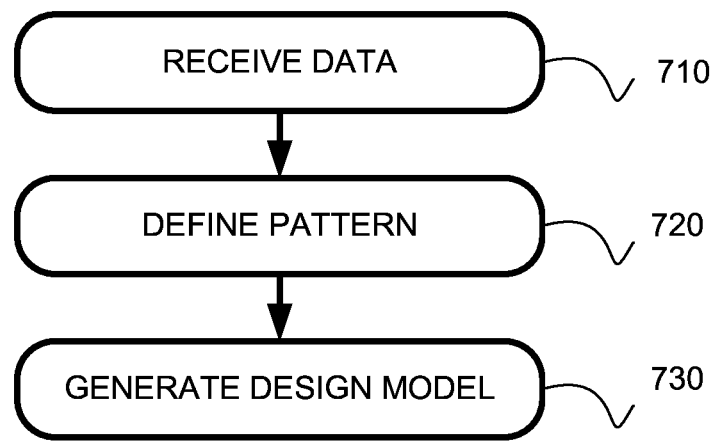
FIG. 7 shows an example flow in accordance with aspects of the invention.

FIG. 7 shows an example flow for performing aspects of the present invention. The steps of FIG. 7 may be implemented in the environment of FIG. 1 and/or in the diagrams of FIGS. 2-6. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 7 depicts an example flow for a process in accordance with aspects of the present invention. At step 710, an application receives data inputted by a user into a requirement tool associated with the application. In embodiments, the data can be inputted as a DDAE format or any other type of format. The data can be associated with a specification model for a particular process (e.g., sales, accounting process, order fulfillment process, etc.).

At step 720, the application can define a pattern which is used to determine a particular number of independent variables, dependent variables, gates, compares, and/or other requirements to generate an irreducible module. In embodiments, the application can use a metamodel to define the pattern. In further embodiments, the requirements can reduce a set of conditions associated with a particular specification into a single condition by using Boolean variables. For example, if the specification model has three conditions, the pattern may reduce the three conditions into one condition to meet the requirements of the specification model. In further embodiments, the application may change the pattern automatically (e.g., an iteration process) or can be manually changed by receiving user inputs via a design tool.

At step 730, the application generates a design model using the metamodel. In embodiments, the design model can be formatted into source code which is then sent to a compiler. The compiler then generates irreducible modules based on the information in the design model.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by at least one computing device, a data driven application engineering (DDAE) specification;
   determining, by the at least one computing device, a metamodel that defines relationships between tokens, lines, and statements found in the DDAE specification, wherein each of the tokens includes a foreign key indicating a relationship with one of the statements;
   defining, by the at least one computing device, a plurality of connector patterns based on the received DDAE specification and the metamodel, wherein the connector patterns modularize a plurality of condition tests as comparisons and gates; and
   generating, using a compiler executing on the at least one computing device, a plurality of irreducible modules in a perl programming language based on the plurality of connector patterns, wherein the plurality of irreducible modules perform the calculation according to the plurality of condition tests to produce an output variable.

2. The method of claim 1, wherein the connector patterns define a set of modules that can be created and combined in any application.

3. The method of claim 1, wherein the irreducible modules are independent of each other and a data flow associated with the irreducible module is identified by the output variable.

4. The method of claim 3, wherein the output variable is identified by a primary key value and is related to other variables by foreign key references.

5. The method of claim 1, wherein the irreducible modules are associated with a parallel computing application.

6. The method of claim 5, wherein the irreducible modules are hardware or software infrastructure agnostic.

7. The method of claim 1, wherein the generating the plurality of irreducible modules includes generating a two dimensional matrix, wherein each entry within the two dimensional matrix is associated with a token within a particular line sequence that is within a statement.

8. The method of claim 1, wherein the plurality of irreducible modules includes a gate connector.

9. The method of claim 8, wherein the gate connector comprises at least one of an AND gate, an OR gate, a NAND gate, and NOR gate and connects two independent variables with a dependent variable.

10. The method of claim 1, wherein the irreducible models are generated in the perl programming language using a SQL query.

11. The method of claim 10, wherein the DDAE specification is received via a graphical user interface.

12. The method of claim 1, wherein the DDAE specification defines a calculation and comprises the plurality of condition tests that are required for assigning a correct value to the output variable.

13. The method of claim 1, wherein the irreducible modules further includes a calculation connector and a comparison connector,
the calculation connector includes at least one of a numeric function, a string function, and an aggregate function defined in the DDAE specification, and
the comparison connector includes a comparison of two independent variables and outputs TRUE if values of the two independent variables comply with the comparison in accordance with the condition tests.

14. The method of claim 13, wherein the calculation connector connects two or three independent variables with a dependent variable by combining the two or three independent variables to assign a value to the dependent variable.

15. The method of claim 13, wherein the comparison connector compares the two independent variables and then assigns a value to a dependent variable.

16. The method of claim 1, further comprising generating at least one irreducible model in a Java programming language.

17. The method of claim 1, wherein the foreign key further indicates a relationship between a line entity, one of the statements, and the metamodel.

* * * * *